Sept. 2, 1958　　　　　　　R. PLANIOL　　　　　2,850,372
METHOD AND APPARATUS FOR CONTINUOUSLY MELTING
SOLID PARTICLES OF MATERIAL
Filed Sept. 14, 1955　　　　　　　　　　　　2 Sheets-Sheet 2
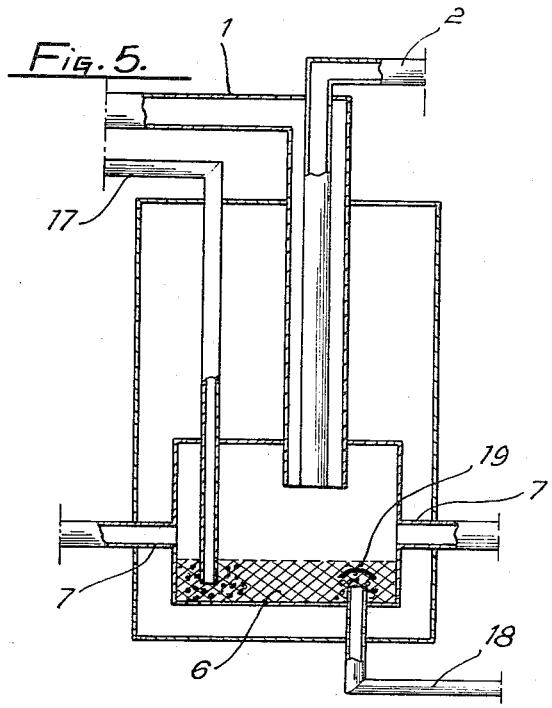
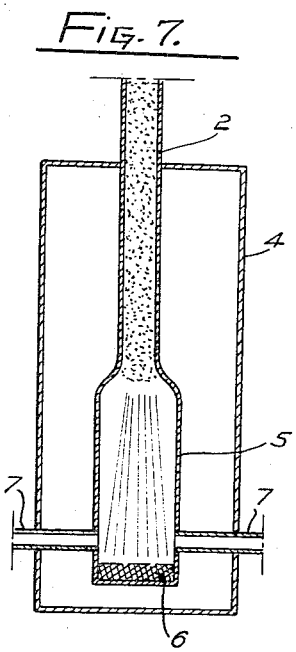
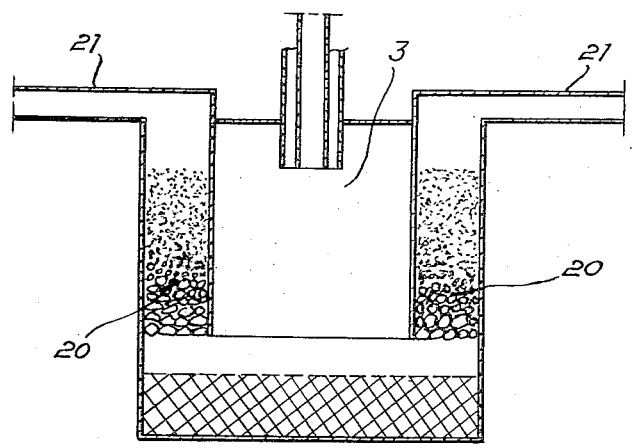
INVENTOR
Rene Planiol
BY
Dean Fairbank & Hirsch
ATTORNEYS United States Patent Office 2,850,372
Patented Sept. 2, 1958

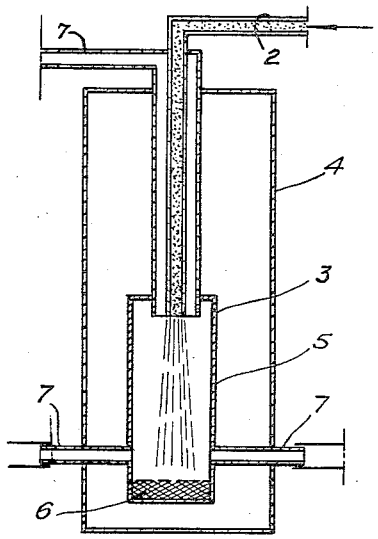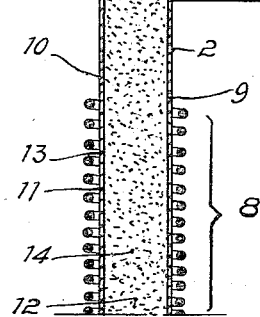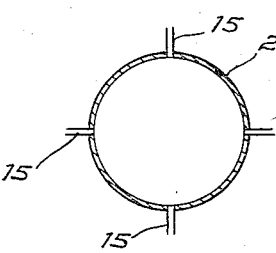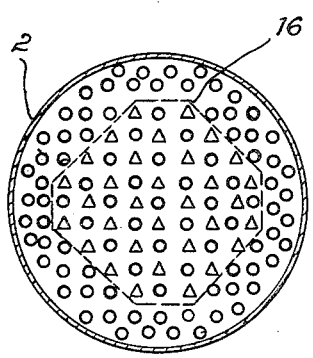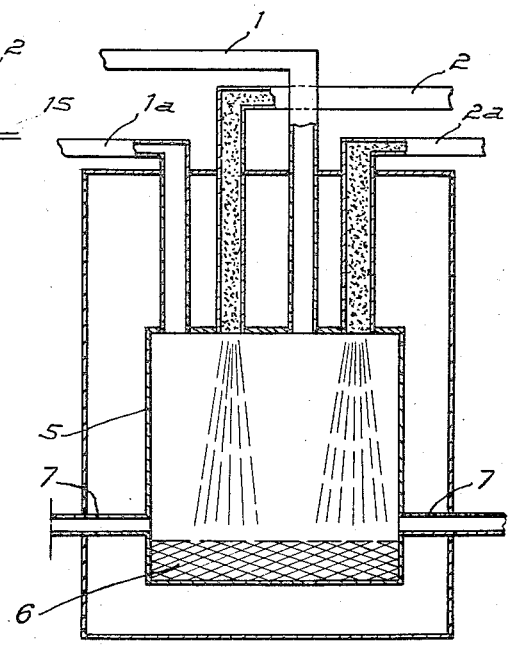

2,850,372
METHOD AND APPARATUS FOR CONTINUOUSLY MELTING SOLID PARTICLES OF MATERIAL

René Planiol, Paris, France

Application September 14, 1955, Serial No. 534,349

Claims priority, application France September 22, 1954

14 Claims. (Cl. 75—26)

The present invention relates to a method for continuously melting solid particles in suspension in a gaseous current and to its application to the reduction of metal oxides. The solid particles and the gas which carries them may be of any kind whatever and the gas and particles may be capable of chemically reacting with each other or not.

Any solid material which may be ground into more or less fine particles capable of being carried in suspension by a gaseous current flowing at a suitable speed and of passing from the solid state to the liquid state by a simple melting or by a heating step accompanied by a chemical reaction with the carrier gas (or at least one of the gases if the carrier gas is a mixture of two or more gases) may be used for the purpose of the present invention and shall be hereinafter called "solid particle."

Two different uses of the present method shall now be referred to, by way of example only and without in any way limiting the scope of invention, which will be described hereinafter.

(1) *Continuous melting of powders suspended in a current of gas*

Metal powders used in powder metallurgy are usually obtained by low-temperature reduction of oxide powders. The temperature is maintained lower than the melting point as otherwise the powder would pass into the liquid state and would form a bath.

Thus the shape of the particles of the metal powder obtained by this method is closely related to that of the oxide particles which are generally of irregular shape. However, for certain uses, a spherical shape is to be preferred.

By means of the present invention it is possible to transform irregularly shaped oxide particles into spherical metal ones. If these particles are dispersed in a gaseous current the temperature is no longer limited to a value below the melting point since the particles are not in mutual contact and their passage into the liquid state does not transform them into a continuous bath. On the contrary, the phenomenon of surface tension transforms the molten particles into substantially spherical droplets. By a subsequent cooling if desired, of these droplets, they will solidify into solid metal globules. Were the heating of the particles carried out substantially to reach the melting point, the conduit into which the mixture of gas and powder is blown may become obstructed due to the fact that the particles which are still solid but in a softened state will adhere to the inner walls of said conduit. The present invention overcomes this adhesion and it shall be described hereinafter in detail with reference to an important application of the invention, viz. the reduction of metal oxides.

(2) *Reduction of metal oxide powders*

The pressure under which the process of reduction takes place may, within the scope of this invention, have any desired value, viz., below, above or equal to the atmospheric pressure. An increase in pressure would result in a corresponding increase in the reaction rate and in the output of the plant.

It has to be assumed in the description which follows that the oxide powder to be reduced is as fine as possible and that it is dispersed as a fine cloud in the carrier gas or mixture of carrier gases whether the latter is reducing, inert or oxidizing, depending on the field to which the invention is applied.

According to the method of direct reduction of the metallic oxide, in accordance with the invention, the powdered ore particles suspended in a carrier gas which may be an inert, a reducing or an oxidizing gas or any desired mixture of such gases are heated to a temperature above the melting point of the particles and are blown through a feeding or blow conduit into a reducing chamber at the bottom of which the molten metal is recovered.

The particles do not become materially changed in composition or physical state when the temperature is slowly raised until a temperature of almost 700° C. is reached. The passage of material remains free and there is no obstruction of the blow conduit or of the oxide and gas inlet and the oxide is not reduced. If the powder is rather fine and if it is made to move with moderate speed, reduction will start above 700° C., but, at the same time, difficulties will occur due to the metal sticking to the walls of the blow or feeding conduit. As the temperature continues to rise, the rate and the percentage of reduction of the material increase very fast. Above 1150° C. the oxide will also stick to the walls and the installation can only be operated for a short time during which the conduit becomes obstructed as long as the material remains in the solid state. Therefore, in the absence of the present invention, to be hereinafter set forth the whole range of temperature between 700° C., in the illustrative application to iron and 1150° C. for the iron oxide, and about 1550° C. for the fusion or liquid state of both substances is unavailable because it leads to obstruction in the feeding conduit. On the other hand, if the temperature is raised above both melting points, the conduit becomes immediately unblocked since the particles which would strongly adhere to the walls liquefy and fall under the influence of gravity and of the current of gas and particles.

The gas propelling the powder may be inert or in order to insure a high reaction rate, may be oxidizing and the hot powder may thereupon be propelled in a current of reducing gas at very high temperature which may in certain cases be different from the temperature of the powder, traveling in the same direction for relatively speedy reduction of the oxide to metal.

If the powder is transported by the reducing gas, mixing with an excess of reducing gas at the end of the heating period may be carried out depending upon the quantity of gas mixed with the powder at the beginning of the heating period.

If the amount of reducing gas is large enough the reduction may be completed in the heating conduit at the end of the heating period when the particles change from the solid to liquid state or even earlier. In this case the chamber following the heating conduit is only used to collect most of the liquid metal, before the mixture of liquid metal and gas enters the filters, described below, if they are needed.

According to the invention, the temperature of the blow-conduit and also of the whole installation: reduction chamber and filters, is carefully maintained above the melting points of the oxide and the metal in order to avoid that the particles of oxide cake and thus obstruct the conduit and the whole installation. Under these conditions, any particle of material which has touched the walls cannot start to obstruct the blow conduit, particularly since, being in the liquid state, it will be quickly moved by the passage of gas and by gravity. Therefore, any part of the conduit and of the installation where the temperature is above the melting point will remain free of any obstruction.

Nevertheless, feeding the powder into the apparatus still raises serious problems.

If the powder is introduced at ordinary temperature and has to be heated above its melting point, it will have to pass through a whole range of temperature and in particular in the case of iron oxide and iron in the preferred illustrative application, through the range from 700° C. or 1150° C. to 1600° C. which renders the system inoperative because of obstruction due to caking within this range, hereinafter sometimes referred to as the "caking zone.".

The powder-gas mixture entering the blow conduit cold or moderately heated will be heated progressively therein. According to the invention, the mixture of gas and powder, is subjected to a gradient of temperature which differs from that of the wall of the conduit.

The desired result is attained by heating the wall of the conduit which peripherally confines the powder-gas or metal-gas mixture, so that the heat passes inwardly to the mixture from the conduit wall at right angles to direction of flow of the powder-gas or metal-gas current.

If additional heat is required to complete the reduction of the powder, oxygen may be introduced into the chamber near the end of the reducing step to produce steam by combination with hydrogen.

The correct control of these two gradients allows of the operation of reduction being carried on indefinitely and without danger of obstruction.

It is an important feature of the present invention that the temperature gradient of the gas-powder mixture and gas-metal mixtures remain lower than that of the wall, it being impossible for the powder-gas or metal-gas mixture to exceed or even to reach the temperature of the encompassing conduit wall region. The gradient may be controlled by means of one or more of three variables, viz.: the density of the gas-powder mixture, the speed at which this mixture moves and the intensity of heating of the conduit.

The relative values of the two gradients should be such that the wall of the feeding conduit is already above the melting point of the powder and of the metal when the mixture enters the caking zone (between 1150° C. and about 1550° C. if the gas accompanying the powder during the period of heating is inert or oxidizing and between 700° C. and about 1550° C. if it is reducing).

No obstruction will occur when the particles of powder and metal are below 1150° C. and 700° C. respectively, since the powder is below the temperature where caking occurs and will not adhere to the wall even if the wall—as is actually the case—is above the critical temperature, between 700 (or 1150) and 1550° C. There is no heat exchange between a particle and the wall by a short contact. If a particle touches the wall, the irregular shapes of the particle and of the wall allow only a contact over a very small area of surface of the two solids. The time of contact between the particle and the wall is also very short (of the order of $10^{-5}$ seconds at the most). In such a short time interval, the quantity of heat transferred from the wall to the particle is so small that the particle temperature does not change appreciably, if at all. As it depends on this temperature whether the particle adheres to the wall or not, it is easily seen that sticking cannot occur at this point. It is not the contact of the powder with the conduit wall which heats the powder. The conduit heats the gas only and it is the gas which then transfers the heat to the powder. When the particle size is very small (several microns), the temperature difference between the gas and the powder will at each moment be negligible. A little further along in the conduit, when the temperature of the particle enters the caking zone it will adhere to the wall, at first only after repeated contacts but faster and faster later on. However, if it has already reached the caking zone, that is, the temperature range where its surface becomes sticky, it adheres to the wall and a new phenomenon takes place. By this prolonged contact with the wall, the temperature of which is above the melting point, the temperature of the particle gradually rises, and it eventually melts or passes into the liquid state. As its size is extremely small (e. g. less than 30 microns) it is entirely within the boundary layer of gaseous flow, where the speed is much lower than in the centre of the gaseous current and the temperature is almost the same as that of the wall. Under such conditions, the particle easily passes into the liquid state. From that moment, it is entrained by gravity and/or the gaseous flow. If the gas is an inert or an oxidizing gas, the material, now liquid, remains in the state of an oxide and is only reduced when it leaves the bottom of the heating oven and passes through the reduction chamber where it mixes with the reducing gas. If the gas is a reducing gas, a more or less complete reduction can already occur as the material is heated as it creeps along the wall. In this case, the said reduction may be completed when the material passes through the chamber.

It can happen that a single isolated particle, even though it has become liquid, remains motionless against the wall instead of descending, being maintained in its position by surface tension or by any other cause such as the lack of smoothness of the wall. Even this is of no consequence since other particles will rapidly coalesce therewith and by increasing in volume these particles will gradually from a liquid drop. Long before the least obstruction can occur, this drop progresses along the wall and is discharged.

Other characteristics and advantages of the present invention shall become apparent from the following description taken in conjunction with the accompanying drawings illustrating one form of embodiment of an installation or plant for carrying out the method according to the invention.

In said drawings:

Figure 1 is a diagram of said plant;

Figures 2 and 2a are detail views of the inlet conduit for the suspended oxide powder;

Figure 3 is likewise a detail view of a plant similar to that shown diagrammatically in Figure 1;

Figures 4 and 5 are diagrams of further modifications of the plant according to the invention;

Figure 6 is a vew of an additional arrangement; and

Figure 7 is a diagram of a further modified form of the plant.

According to the embodiment shown in Figure 1, a reducing gas is introduced into the reduction plant through an inlet conduit 1 and an oxide to be reduced, in powdered form (for example iron oxide), is introduced through another conduit 2.

This powdered oxide is maintained in suspension in the form of a cloud by means of a gas injected in the said conduit 2 simultaneously with the oxide. This gas can be an inert or a reducing gas or even, in certain cases, an oxidizing gas. In the case of an inert gas, no reaction can take place before the suspension reaches the point 3 where the heated powder mixes with the reducing gas issuing from the conduit 1.

The use of two separate conduits 1 and 2 respectively for the reducing gas and for conveying the powder to be reduced, suspended in a gas or in a mixture of gases, may be advantageous in certain cases because it permits different combinations: different gases may, for instance, be used in conduits 1 and 2 or these conduits may be heated to different temperatures.

In many other cases, however, the apparatus may be simplified as shown in Figure 7 by omitting conduit 1. The carrier gas must then be a reducing gas, although for certain applications a small quantity of oxidizing gas may be added to it in order to raise the overall temperature. Under these condtions the reduction takes place in conduit 2, where it may be partial or complete, the latter alternative being usually preferable. In chamber 5, the mixture is slowed down and the liquid metal is deposited at the bottom at 6.

Referring again to Figure 1, conduit 1 as well as conduit 2, which are, if necessary, provided with additional heating means, extend through a heating oven 4 before reaching point 3 where they issue into a reduction chamber 5.

The reduced powder falls as a liquid, in the form of a spray, to the bottom of the chamber where it forms a liquid molten metal bath 6. The gases escape from the reduction chamber through side conduits 7.

It has been stated above that an intimate mixture of an inert or reducing gas and of a finely comminuted and pure iron oxide powder is blown into a hot conduit.

Assuming that the conduit 2 is not additionally heated, it is observed that up to a temperature of 400 or 500° C. no reaction takes place. Reduction starts when red-heat temperature is reached, and the speed of reduction then increases rapidly. At 1150° C. it becomes very substantial but the increase of temperature is limited by an increased tendency of the particles to adhere to the walls of the conduit 2; such adhesion is the greater as the temperature rises in the range from 1150° C. to 1550° C., where the oxide and metal powder soften with the result that the conduit becomes obstructed and the reducing operation can no longer be pursued.

At about 1550° C., the oxide, and shortly thereafter the metal, become pasty and finally pass into the molten state. From that moment on, the operation of the plant becomes normal again.

This can be explanied by the fact that every time a particle of oxide or of metal, after having become liquid, comes into contact with the wall of the conduit, it can only adhere to said wall for a very brief period of time. If the droplet is sufficiently fine, surface tension phenomena can maintain it in a fixed position against the wall. In this case, another droplet, followed by a number of others, coalesce with the original droplet and as soon as their volume has become sufficient, the effect of gravity or of the gaseous flow is sufficient to urge it on.

The additional heating means for the conduit 2, when necessary, may consist, as shown in Figure 2, of an electric heating coil 8, or as an alternative, a hot gas in the oven and about the conduit may be used.

The mixture of gas and of powder is introduced cold into the conduit 2. From a point 9, the conduit is heated and a longitudinal temperature gradient is established along the wall of the conduit 2. This conduit which is still cold rising progressively downward at 10, reaches its maximum temperature at 11 the temperature progressively rising from point 10 to point 11. From this point onward, the temperature remains constant down to the chamber 5.

On the other hand, the temperature of the suspension heated from the wall of the encompassing conduit 2 increases less rapidly and the melting point is only reached at a point 12 which is closer to the reduction chamber 5.

The wall of the conduit 2 reaches the temperature at which caking of the oxide particles begins (about 1150° C.) at 13, between the points 10 and 11. It is obvious that the temperature of the fluid at each section of the conduit 2 is always lower than that of the corresponding section of the encompassing wall of said conduit.

The difference between the two temperature gradients, viz. that of the wall of the conduit 2 and that of the fluid conveying the suspended powder is so chosen that at the point 13 where the wall temperature, of conduit 2 reaches the value where caking of the solid particles begins the fluid at this same point is still at a substantially lower temperature. Under these circumstances if a particle comes into contact with the wall of the conduit 2 at this point 13 it cannot adhere thereto.

The difference between these two gradients can be controlled at will by altering the speed of flow of the fluid in the conduit 2 and also the size of said conduit. It is obvious that the difference between the temperature of the wall of conduit 2 and that of the fluid will be the greater as the speed of flow is greater. It is also possible to control the apparent density of the gas-powder mixture by adjusting the amount of powder suspended in each litre of gas.

This speed of flow is so chosen that even when the fluid reaches the point 13, its temperature is still lower than the critical temperature at which the particles begin to cake, as already explained.

At a point 14 between the aforementioned points 11 and 12, the particles in suspension reach the caking zone, which is the critical temperature, i. e. above 700° C. for the metal and 1150° C. for the oxide.

The temperature of the particle which has just adhered to the wall, at this level, slowly rises until it reaches that of the wall. As point 14 is downstream relatively to point 11 where the melting point is reached, the said particle, after heating, passes into the liquid state and is entrained by the current of fluid without causing any obstruction of the conduit 2.

Both temperature gradients can be controlled separately.

The temperature gradient of the wall of the conduit 2 can be controlled by altering the intensity of the heating current in the coil 8 or the temperature and the speed of a hot gas circulating around the conduit 2, if heating by a hot gas is resorted to.

The temperature gradient of the gas carrying the oxide powder in suspension can be altered by varying the density of the suspension and, as already stated, by varying the speed of flow of the gas and powder within the conduit 2 and the size of said conduit.

The particles of oxide and of metal, after they have become liquid, are separated from the gas and are recovered at the bottom of the chamber 5 in the form of a pure molten metal bath.

To improve the operation of the installation, inert or reducing gas inlets 15 (Figure 2a) may be provided if desired, in the conduit 2. The gas thus issuing into the conduit produces a surface film of pure gas on the walls, thereby greatly reducing the contact of the droplets of liquid metal with the wall of the conduit so that its wear is substantially reduced also. Instead of employing gas inlets such as 15, the wall of the conduit may be made of a porous material which allows the diffusion of a continuous layer of pure gas inside the wall. This device can be applied either to the conduit 2 which heats the mixture of gas and powder or to the reduction chamber 5 or to both.

In the modification shown in Figure 4, a reducing gas enters through two different conduits (1 and 1a), and the oxide powder in suspension enters likewise by two other tubes (2 and 2a).

In this embodiment, the tubes conveying the reducing gas are not mounted co-axially with the tubes conveying the powder, as in the case of the arrangement shown in Figure 1.

The reducing gas tubes and the powder conveying tubes all discharge into the enclosure 5. The reduced liquified powder falls to the bottom of that enclosure where it forms a liquid metal bath 6. The partially combusted gases are withdrawn through the lateral orifices 7.

In the case of large-scale installations, there may be a considerably greater number of tubes so as to form a tubular bundle (Figure 3). Under these conditions it is desirable to arrange the gas and powder tubes in a regular network in order to obtain as rapid and homogeneous a mixture of gas and powder as possible.

Fig. 3 represents the cross-section of a multi-tubular installation. The gas and powder tubes are indicated thereon by two different symbols to differentiate them, the circles for the gas and the triangles for the powder.

It can be seen that in the central portion inside the octagon enclosed by the broken line 16, the distribution of the tubes is regularly alternated, thus ensuring an excellent mixing of gas and powder. Outside that octagon only gas tubes are provided for.

If, as explained above, the gas used to convey the powder is itself the reducing gas, a single symbol would be sufficient inside the octagon viz.: the triangles corresponding to the powder conveying tubes. On the other hand, tubes for feeding a particle-free gas could still be used outside the octagon in certain cases, if so desired.

Most of the time the oxide is not absolutely pure and a small amount of slag is produced from the impurities. This slag, however, is itself completely liquid at the high operating temperatures and it runs along the walls of the conduit just like the drops of metal. A floating liquid slag is formed on the liquid metal bath, which may readily be skimmed off from the metal in conventional manner.

In the embodiment shown in Figure 5, the liquid metal bath 6 may receive additional substances which do not have to undergo reduction, as for instance carbon.

Such additional substances may be introduced by means of conduit 17 which extends through the installation, and discharges into the bath 6.

The added substance is introduced into the bath in the state of a powder suspended in a stream of gas and travelling at the same speed as the gas. The gas then rises as bubbles to the surface. This arrangement enables the distance through which the bubbles travel as well as the time they remain in the metal bath to be increased.

According to another arrangement, the added substance in suspension is introduced into the liquid bath by means of a conduit 18 discharging into the bottom of the reduction chamber.

The time which the bubbles of gas entering through conduit 18 take to pass through the bath may be increased by means of a bell-shaped body 19 covering the opening of conduit 18.

In the installations schematically represented in the accompanying drawings, an amount of metal which is not negligible may be entrained with the gas through the lateral tubes 7. The quantity of metal thus removed will evidently increase with a decrease in particle size of the powder.

In order to meet the difficulty, there is provided a device for the recovery of the particles escaping with the gas.

In the embodiment as represented in Figure 6, instead of escaping through the lateral tubes 7, the gas enters an annular space 20, which surrounds the reduction chamber 3. This annular space is filled with refractory bodies whose size progressively decreases in an upward direction. Aluminum oxide is very suitable for this purpose. A purified gas will escape through the orifices 21.

The embodiment of Fig. 7 is similar to that of Fig. 1 except that both the powdered oxide and the gas are injected through one and the same conduit 2 instead of resort to separate conduits 1 and 2, as shown for instance in Fig. 1.

Generally, the above description has only the character of an explanation and is in no way limiting. Numerous modifications would be possible within the scope of the invention.

I claim:

1. Method for continuously melting particles of solid material of character that has a tendency to cake at temperatures somewhat below the melting temperature consisting in propelling such particles in suspension in a peripherally confined current comprising a gas, while applying heat to the current transversely through the peripheral confinement thereof, and so controlling the heat that said confinement is at temperature at least equal to the melting temperature of such particles at the regions at which such suspension reaches a temperature sufficiently high for the particles to cake at the peripheral confinement.

2. Method for the direct reduction of particles of powdered metal oxides comprising propelling such particles in a peripherally confined course and at at least a portion of the course of propulsion of such particles, bringing the same into intimate engagement with a reducing gas, while applying heat transversely through the peripheral confinement and so controlling the heat that said confinement is at temperature at least equal to the melting temperature of said particles at the region at which the particles have reached a temperature at which caking at the peripheral confinement commences, and collecting the molten metal resulting from the reduction process.

3. Method for the direct reduction of powdered metal oxides comprising introducing a current of reducing gas into a reduction zone, separately introducing a current of metal oxide particles suspended in a gas into said reduction zone, applying heat transversely of such current of metal oxide through a current confining heat conductive passageway to raise the temperature of such passageway to a value greater than the melting temperature of the oxide and of the metal whereby the temperature gradient of the current of suspended oxide is less than that of the passageway, so that when the suspended oxide particles reach a point where they become heated to the critical temperature at which the particles start to cake, the temperature of the passageway at that point is already above said melting temperature, and recovering the liquid metal obtained in said reduction zone.

4. Method according to claim 3 wherein the metal oxide particles are suspended in an inert gas.

5. Method according to claim 3 wherein the metal oxide particles are suspended in a reducing gas.

6. Method according to claim 3 wherein the metal oxide particles are suspended in an oxidizing gas.

7. Method for the direct reduction of powdered metal oxides comprising passing a current of metal oxide particles suspended in a reducing gas through a heat conductive passageway, heating the wall of said passageway to a temperature greater than the melting temperature of the oxide and of the metal whereby the temperature gradient of the current of suspended oxide is less than that along said passageway so that when the suspended oxide particles reach a point in their travel where they become heated to the critical temperature at which the particles start to cake, said passageway is already above said melting temperature, and recovering the liquid metal obtained by the reduction in said conduit.

8. The method recited in claim 2 wherein a superficial layer of non-oxidizing gas intervenes between the confinement and the propelled particles and serves to hinder contact between the same.

9. The method as claimed in claim 1 in which a layer of non-oxidizing gas is introduced transversely through the peripheral confinement for the current.

10. The method as claimed in claim 2 which comprises introducing into the molten metal additional materials in suspended form and means for venting the spent gases.

11. Installation for the direct and continuous reduction and melting of metal oxides comprising, in combination, at least one heat conducting conduit for particles of metal oxide to be reduced, means for propelling and maintaining intimately admixed with such particles at at least a substantial portion of said conduit, a reducing gas to form a suspension of the particles in such gas, means for applying heat exteriorly of the inner wall of said conduit for conduction through said wall and transversely of said conduit, to attain a temperature of said wall above that of melting and below that of vaporization of the oxide and of the metal, whereby the temperature gradient of the current of suspended oxide within said conduit is lower than that along the walls thereof, means for introducing a superficial layer of non-oxidizing gas on the inner wall of the inlet conduit for the metal oxide suspension, and means for collecting the molten metal reduced in said conduit.

12. Installation according to claim 11, wherein the conduit comprises a refractory porous structure that permits the diffusion of such non-oxidizing gas therethrough.

13. Installation for the direct and continuous reduction and melting of metal oxides comprising, in combination, at least one heat conducting conduit for particles of metal oxide to be reduced, means for propelling and maintaining intimately admixed with such particles at at least a substantial portion of said conduit, a reducing gas to form a suspension of the particles in such gas, means for applying heat exteriorly of the inner wall of said conduit for conduction through said wall and transversely of said conduit, to attain a temperature of said wall above that of melting and below that of vaporization of the oxide and of the metal, whereby the temperature gradient of the current of suspended oxide within said conduit is lower than that along the walls thereof, means for collecting the molten metal reduced in said conduit and means for venting the escaping gases, said means comprising a body of refractory material directly above the molten metal and serving for intercepting any metal entrained with the escaping gases, for gravity return to the body of molten metal therebelow.

14. Installation for carrying out the direct reduction of metal oxides comprising, in combination, a plurality of spaced conduits for the metal oxide to be reduced in suspension in a reducing gas, means for applying heat from about the exterior of said conduits to raise the same to a temperature above that of melting but below that of vaporization of the oxide and of the metal therein, whereby the temperature gradient of the current of said suspended oxide within said conduits is less than that along the walls thereof, a chamber into which said conduits discharge for collecting the molten metal reduced in said conduits, means for producing a superficial layer of non-oxidizing gas on the inner wall of the conduits, said latter means comprising a conduit of porous material which permits the diffusion of a non-oxidizing gas through said wall into the said conduits.

References Cited in the file of this patent

UNITED STATES PATENTS

| | | |
|---|---|---|
| 1,969,264 | Grant | Aug. 7, 1934 |
| 2,086,201 | Zeisberg | July 6, 1937 |
| 2,166,207 | Clark | July 18, 1939 |
| 2,181,148 | Perkins et al. | Nov. 28, 1939 |
| 2,249,410 | Wilson | July 15, 1941 |
| 2,446,637 | Crampton et al. | Aug. 10, 1948 |
| 2,540,593 | Ogorzaly | Feb. 6, 1951 |
| 2,560,470 | Ogorzaly | July 10, 1951 |
| 2,562,813 | Ogorzaly et al. | July 31, 1951 |